W. H. BRISTOL.
RADIUS AVERAGING INSTRUMENT.
APPLICATION FILED JULY 10, 1909.

938,962. Patented Nov. 2, 1909.

Witnesses:
John E. Prager
William J. Walker

Inventor:
William H. Bristol
By his Attorney
Fred'k P. Schuster

UNITED STATES PATENT OFFICE.

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

RADIUS-AVERAGING INSTRUMENT.

938,863.

Specification of Letters Patent.

Patented Nov. 2, 1909.

Application filed July 10, 1909. Serial No. 506,890.

*To all whom it may concern:*

Be it known that I, WILLIAM H. BRISTOL, a citizen of the United States, and a resident of Waterbury, in the county of New Haven and State of Connecticut, have invented certain new and useful Improvements in Radii-Averaging Instruments, of which the following is a specification.

My invention relates to integrating or averaging instruments for polar or radial diagrams, and particularly to a device such as disclosed in U. S. Letters Patent #927,888 of July 6th, 1909 for averaging radii, viz: obtaining the mean radial ordinate.

It has for its object to provide a simple, readily assembled and accurate averaging device which shall be comparatively inexpensive to construct and suitable for general application.

A device of this character is applicable to diagrams plotted in polar coördinates, whether on straight radial lines; or, in connection with diagrams resulting from rotating dial recording gages, in which the tracing arm has a curvilinear path.

Figure 1:
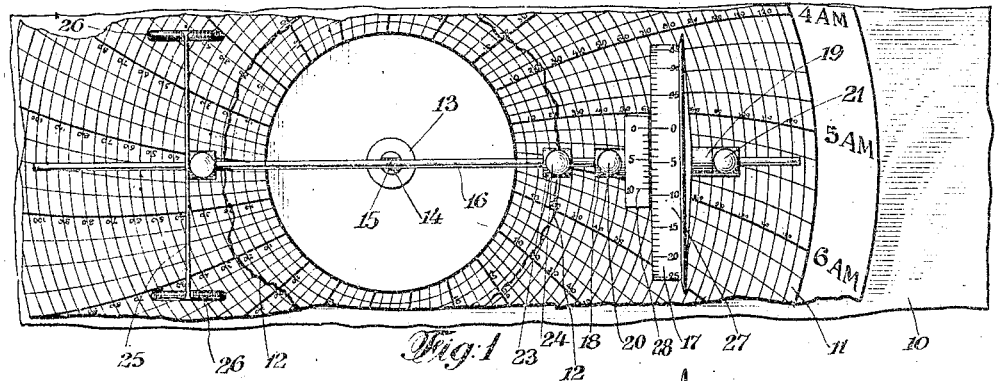
Figure 2:
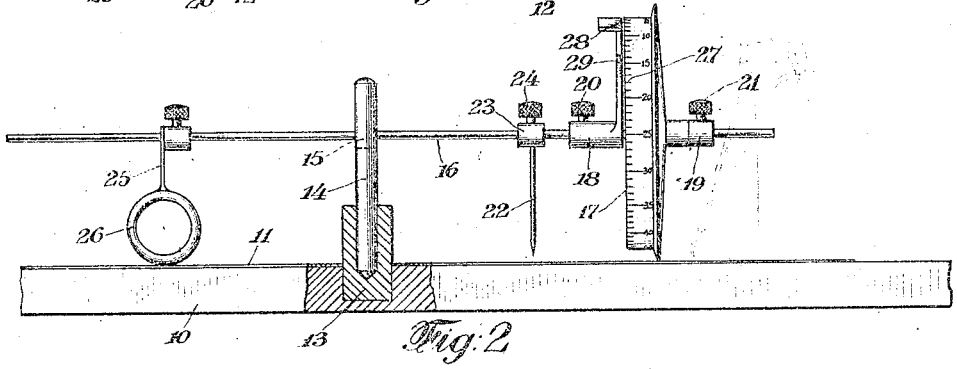
Figure 3:
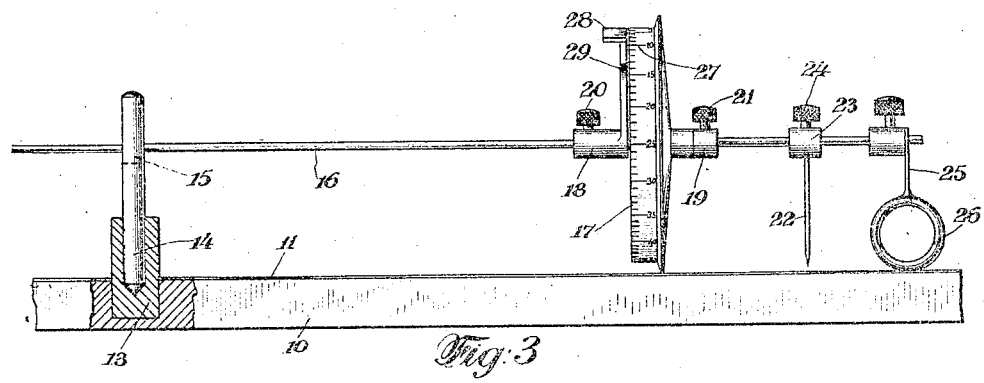
Figure 4:
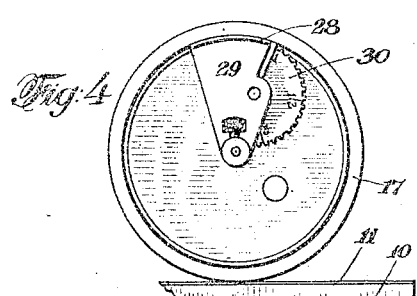
Figure 5:
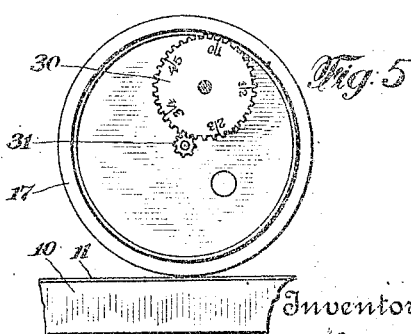

In the accompanying drawings which illustrate my improved device—Figure 1 is a plan view of the averaging instrument. Fig. 2 is a side elevation of same. Fig. 3 is a side elevation of a modification. Figs. 4 and 5 are views illustrating the revolution counting mechanism.

Similar characters of reference designate corresponding parts throughout the several views.

Referring now to the drawings—10 designates a suitable base to support a chart 11, the radii of whose irregular record 12 are to be averaged, the said chart being fitted over a socket 13. Within this socket is mounted a rotatable pin 14 provided at its top with a vertical groove 15 to receive a tracer-bar 16. This bar is capable of radial movement sliding lengthwise in said groove and is also capable of rotation about the vertical axis of said pin. An integrating wheel 17 is rotatably mounted near one end of the tracer-bar, being held in place by two collars 18 and 19 secured to said tracer-bar 16 by corresponding set-screws 20 and 21. A tracing point 22 is mounted upon the said tracing-bar 16 intermediate of said pin 14 and integrating wheel 17 by means of a collar 23 and set-screw 24. This point extends downwardly from said tracer-bar and preferably to within a short distance of the chart 11 so that the record 12 thereon may be readily followed. At the opposite end of the tracer-bar is secured a forked support 25 terminating in finger pieces 26 which rest upon the chart 11 and by which the point 22 may be conveniently guided over the curve 12. In Fig. 3 these finger pieces as well as the marking point 22 are both upon the same side of the pin 14 and beyond the integrating wheel 17. This construction, however, does not permit of the tracing point 22 being brought as close to the center of the chart 11 as is possible in the construction set forth in Figs. 1 and 2.

The integrating wheel 17 is provided with appropriate graduations 27 which register with a vernier 28 of a plate 29 carried by the collar 18. This plate carries also a counting wheel 30 meshing with a pinion 31 carried by the said integrating wheel, whereby the number of revolutions of said integrating wheel are recorded.

The construction herein set forth presents several decided advantages over the form of device such as disclosed in the aforesaid patent, in that it is not necessary to pivotally secure the integrating wheel to the tracer-bar in order to maintain a uniform friction between the said integrating wheel and the chart.

The present device is supported so that the integrating wheel 17 and the tracer-bar 16 in effect swing about the line of contact determined by the points at which the finger pieces 26 make contact with the chart. The said tracer-bar being suitably guided by the pin 15 provided with a vertical guideway, the friction between the chart and the integrating wheel due to the weight of the said integrating wheel and tracer-bar will remain uniform regardless of any irregularity of the surface of the chart over which the said wheel or support might move.

The device, further, is extremely simple in construction and may be readily taken apart and packed in small space, and again as readily assembled. If the integrating wheel be made of sufficient diameter, the revolution counting mechanism may, of course, be dispensed with.

I claim:—

1. In a radii averaging instrument: the combination with a suitable base; of a guiding device free to rotate thereon and providing a vertical guideway; a tracer-bar passing through said guideway and free to slide lengthwise therein; a support for said tracer-bar; an integrating wheel rotatable on said tracer-bar; and a tracing point carried by said tracer-bar and projecting downwardly therefrom.

2. In a radii averaging instrument: the combination with a suitable base provided with a socket; of a pin fitting said socket, rotatable therein and providing a vertical guideway; a tracer-bar passing through said guideway and free to slide lengthwise therein; a support for said tracer-bar; an integrating wheel rotatable on said tracer-bar; and a tracing point carried by said tracer-bar and projecting downwardly therefrom.

3. In a radii averaging instrument: the combination with a suitable base provided with a socket; of a vertically grooved pin fitting said socket and rotatable therein; a tracer-bar passing through the groove of said pin; a support for said tracer-bar; an integrating wheel rotatable on said tracer-bar; a tracing point carried by said tracer-bar and projecting downwardly therefrom.

4. In a radii averaging instrument: the combination with a suitable base; of a guiding device free to rotate thereon and providing a vertical guideway; a tracer-bar passing through said guideway and free to slide lengthwise therein; a support for said tracer-bar; an integrating wheel rotatable on said tracer-bar, and a tracing point intermediate of said pin and said integrating wheel, carried by said tracer-bar and projecting downwardly therefrom.

5. In a radii averaging instrument: the combination with a suitable base; of a guiding device free to rotate thereon and providing a vertical guideway; a tracer-bar passing through said guideway and free to slide lengthwise therein; a forked support for said tracer-bar, terminating in finger pieces; an integrating wheel rotatable on said tracer-bar; and a tracing point carried by said tracer-bar and projecting downwardly therefrom.

Signed at New York in the county of New York and State of New York this 9th day of July A. D. 1909.

WILLIAM H. BRISTOL.

Witnesses:
LAURA E. SMITH,
SALLYE O. YEDIZKY.